(12) United States Patent
Valdez et al.

(10) Patent No.: US 7,658,401 B2
(45) Date of Patent: Feb. 9, 2010

(54) INFLATABLE CURTAIN AIRBAG SYSTEMS

(75) Inventors: Edgardo Valdez, Beverly Hills, MI (US); William Abramczyk, Rochester Hills, MI (US); Karen Balavich, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 11/669,444

(22) Filed: Jan. 31, 2007

(65) Prior Publication Data

US 2008/0179865 A1 Jul. 31, 2008

(51) Int. Cl.
*B60R 21/213* (2006.01)
*B60R 21/231* (2006.01)

(52) U.S. Cl. .................. 280/730.2; 280/743.2
(58) Field of Classification Search .............. 280/730.2, 280/743.1, 743.2
See application file for complete search history.

(56) References Cited

U.S. PATENT DOCUMENTS

| | | | | |
|---|---|---|---|---|
| 5,480,181 A * | 1/1996 | Bark et al. | ............... | 280/730.2 |
| 5,588,672 A * | 12/1996 | Karlow et al. | ............ | 280/730.2 |
| 5,788,270 A | 8/1998 | Haland et al. | | |
| 5,865,462 A * | 2/1999 | Robins et al. | ............. | 280/730.2 |
| 5,924,722 A * | 7/1999 | Koide et al. | .............. | 280/730.2 |
| 6,000,715 A * | 12/1999 | Tschaeschke | ............ | 280/730.2 |
| 6,010,149 A * | 1/2000 | Riedel et al. | ............. | 280/730.2 |
| 6,073,961 A * | 6/2000 | Bailey et al. | ............. | 280/730.2 |
| 6,095,551 A * | 8/2000 | O'Docherty | ............. | 280/730.2 |
| 6,135,493 A * | 10/2000 | Jost et al. | ................. | 280/730.2 |
| 6,152,481 A * | 11/2000 | Webber et al. | ........... | 280/730.2 |
| 6,224,091 B1 * | 5/2001 | Eyrainer et al. | .......... | 280/730.2 |
| 6,260,878 B1 * | 7/2001 | Tanase | ..................... | 280/730.2 |
| 6,293,581 B1 * | 9/2001 | Saita et al. | ............... | 280/730.2 |
| 6,318,753 B1 * | 11/2001 | Valkenburg | ............. | 280/730.2 |
| 6,367,836 B1 * | 4/2002 | Tanase et al. | ............ | 280/730.2 |
| 6,457,740 B1 | 10/2002 | Vaidyaraman et al. | | |
| 6,464,250 B1 * | 10/2002 | Faigle et al. | ............. | 280/730.2 |
| 6,672,612 B2 | 1/2004 | Sauer et al. | | |
| 6,695,342 B2 * | 2/2004 | Tanase et al. | ............ | 280/730.2 |
| 6,709,008 B2 | 3/2004 | McGee et al. | | |
| 6,712,386 B2 | 3/2004 | Fischer | | |
| 6,758,490 B2 | 7/2004 | Hoeft et al. | | |
| 6,783,152 B2 * | 8/2004 | Tanase et al. | ............ | 280/730.1 |
| 6,808,203 B2 | 10/2004 | Takahara | | |
| 6,820,893 B2 * | 11/2004 | Tanase et al. | ............ | 280/730.2 |
| 6,889,999 B2 | 5/2005 | Dominissini et al. | | |
| 7,240,915 B2 * | 7/2007 | Peng et al. | ................ | 280/730.2 |
| 2001/0006287 A1 * | 7/2001 | Tanase et al. | ............ | 280/730.2 |
| 2001/0038197 A1 * | 11/2001 | Herzog | .................... | 280/730.2 |
| 2002/0027342 A1 * | 3/2002 | Sauer et al. | .............. | 280/730.2 |
| 2003/0011175 A1 * | 1/2003 | Hess et al. | ................ | 280/730.2 |
| 2003/0080541 A1 * | 5/2003 | Kalandek et al. | ......... | 280/730.2 |
| 2003/0094800 A1 | 5/2003 | McGee et al. | | |
| 2003/0178832 A1 | 9/2003 | Dominissini et al. | | |
| 2004/0130129 A1 * | 7/2004 | Takahara | ................. | 280/730.2 |
| 2006/0012156 A1 * | 1/2006 | Boxey | ..................... | 280/730.2 |
| 2006/0033314 A1 * | 2/2006 | Karlbauer et al. | ........ | 280/730.2 |
| 2007/0052212 A1 * | 3/2007 | Powals | ....................... | 280/729 |
| 2008/0079246 A1 * | 4/2008 | Dix | ........................... | 280/730.2 |

\* cited by examiner

*Primary Examiner*—Paul N Dickson
*Assistant Examiner*—Laura Freedman
(74) *Attorney, Agent, or Firm*—Frank A. MacKenzie; Brooks Kushman P.C.

(57) ABSTRACT

A curtain airbag system includes a sail panel. The sail panel may be attached with an inflatable curtain of the curtain airbag system.

8 Claims, 3 Drawing Sheets

INFLATABLE CURTAIN AIRBAG SYSTEMS

BACKGROUND OF THE INVENTION

1. Field of the Invention

The invention relates to inflatable curtain airbag systems.

2. Background Discussion

Vehicle curtain airbag systems may include a sail panel to reduce occupant limb excursion through a front corner of the vehicle if the curtain airbag system is deployed.

Packaging space for pre-deployed curtain airbag systems may be limited. Curtain airbag systems including a sail panel may require more packaging space than curtain airbag systems not including a sail panel.

It is desirable to reduce the amount of packaging space required for pre-deployed curtain airbag systems including a sail panel.

SUMMARY OF THE INVENTION

Embodiments of the invention may take the form of a curtain airbag system for a vehicle having a passenger compartment with a front corner. The system includes an inflatable curtain having a front edge and a sail panel for reducing occupant limb excursion through the front corner of the passenger compartment if the system is deployed. The sail panel has an overlapping portion including an overlapping edge that overlaps at least a portion of the front edge of the inflatable curtain. The sail panel is intermittently attached with the inflatable curtain along the overlapping edge.

Embodiments of the invention may include an. inflatable curtain having a front edge and a first tether attached to the inflatable curtain for maintaining the inflatable curtain in a desired position if the system is deployed. The system may also include a sail panel attached to the first tether for reducing occupant limb excursion through the front corner of the passenger compartment if the system is deployed. At least a portion of the sail panel does not overlap the front edge of the inflatable curtain.

The system may also include an inflatable curtain having front and bottom edges. The front edge forms an angle with the bottom edge. The system also includes a sail panel for reducing occupant limb excursion through the front corner of the passenger compartment if the system is deployed. The sail panel has an overlapping portion including an overlapping edge that overlaps at least a portion of the front edge of the inflatable curtain. The sail panel is attached to the inflatable curtain along the overlapping edge. The overlapping edge forms an angle with the bottom edge of the inflatable curtain different than the angle formed by the front and bottom edges of the inflatable curtain.

DETAILED DESCRIPTION

Figure 1:
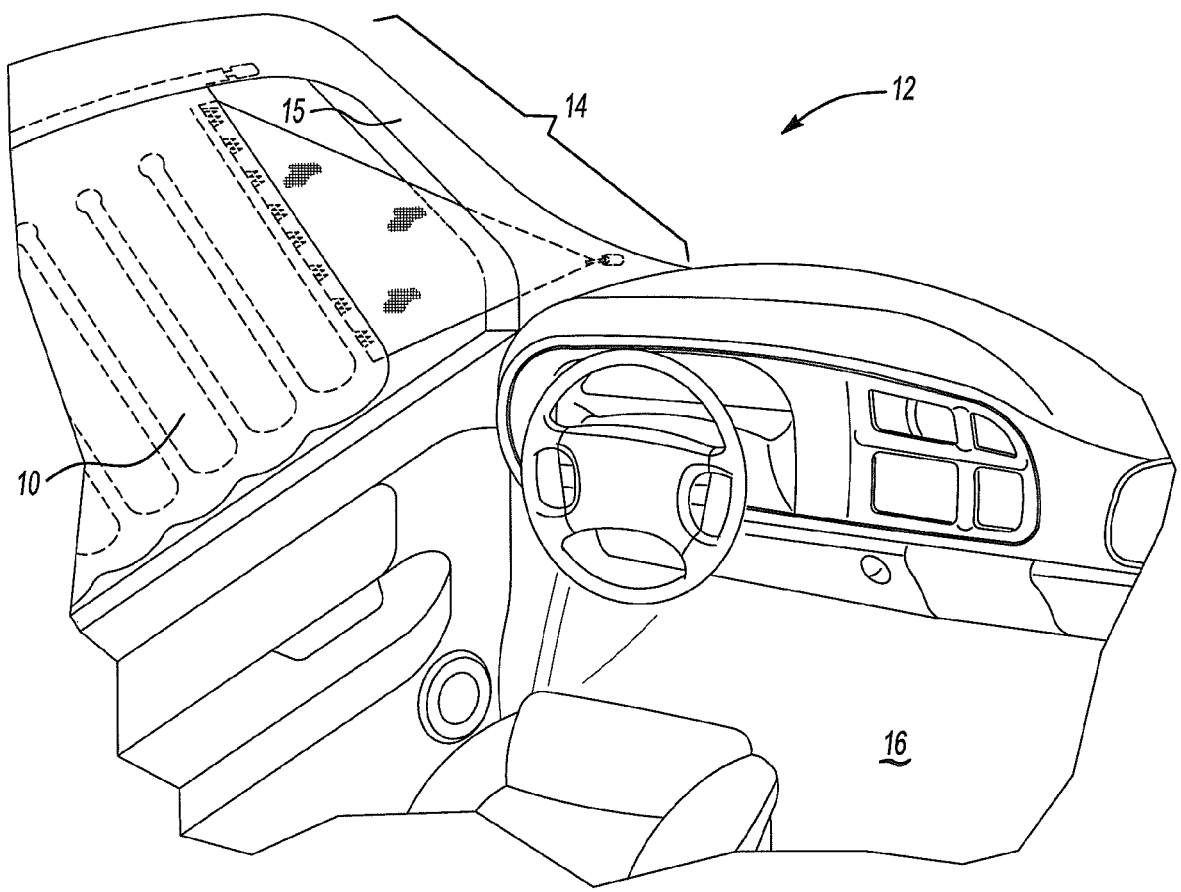
FIG. 1 is a schematic diagram of a vehicle environment for an embodiment of a deployed curtain airbag system.

FIG. 1 is a schematic diagram of an environment for curtain airbag system 10 if system 10 is deployed. The environment includes vehicle 12 having a front corner 14 including A-pillar 15 of passenger compartment 16.

Figure 2:
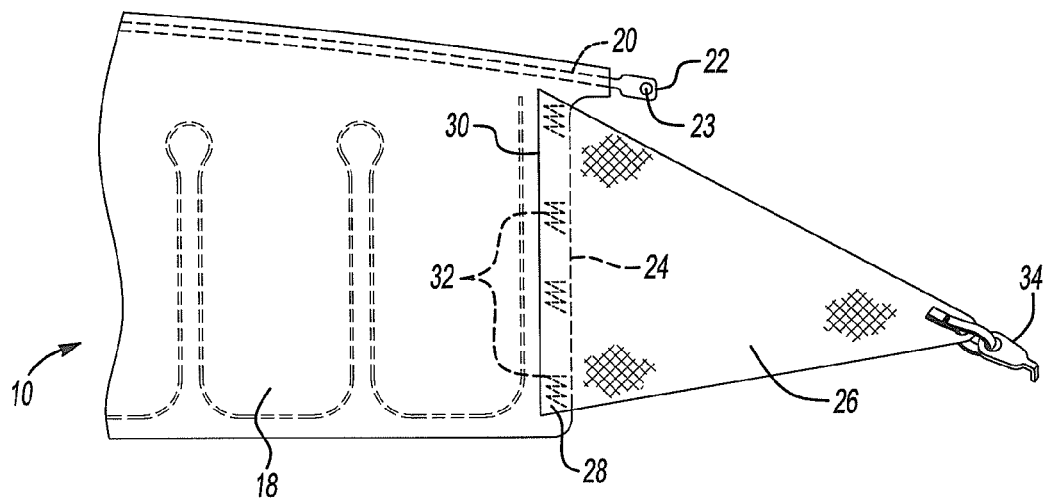
FIG. 2 is a schematic diagram of an embodiment of a sail panel and a portion of an inflatable curtain.

FIG. 2 is a schematic diagram of a portion of system 10. System 10 includes inflatable curtain 18 which is made from reinforced nylon. If deployed, curtain 18 is filed with gas from an airbag inflator (not shown). Gas travels along fill tube 20 and into curtain 18. Fill tube 20 includes crimped end 22 with hole 23 drilled through to mount system 10 to A-pillar 15 (FIG. 1). Curtain 18 includes front edge 24.

System 10 also includes triangular shaped sail panel 26 which is made from reinforced nylon. Overlapping portion 28 overlaps a portion of inflatable curtain 18. Overlapping portion 28 includes overlapping edge 30. Sail panel 26 is sewn at linearly spaced intervals to curtain 18 along overlapping edge 30, as shown at 32. Sail panel 26 may be attached alternatively to curtain 18 along overlapping edge 30 in any desired fashion, e.g., riveted.

System 10 further includes retainer clip 34 attached with sail panel 26 and configured to be attached with a base of A-pillar 15 (FIG. 1).

If system 10 is deployed, sail panel 26 reduces occupant limb excursion through front corner 14 (FIG. 1) of passenger compartment 16 (FIG. 1).

Figure 3:
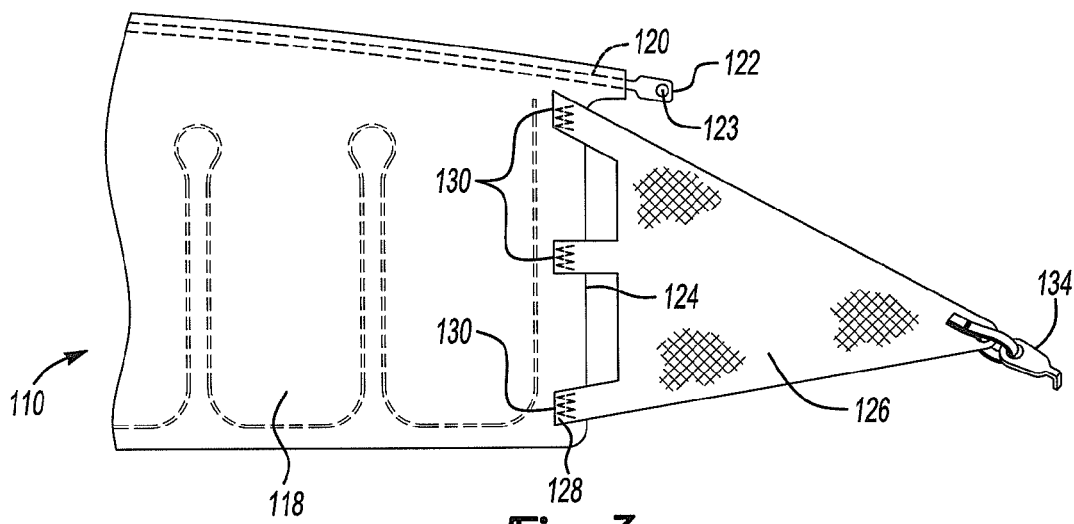
FIG. 3 is a schematic diagram of an alternative embodiment of a sail panel and a portion of an inflatable curtain.

FIG. 3 is a schematic diagram of an alternative embodiment of a portion of system 10. Numbered elements of FIG. 3, and numbered elements of any additional figures, that differ by multiples of 100 relative to numbered elements of FIG. 2 have similar descriptions, e.g., 118 and 18 are each curtains.

FIG. 3 shows that portions of sail panel 26 do not overlap front edge 124 of curtain 118.

Figure 4:
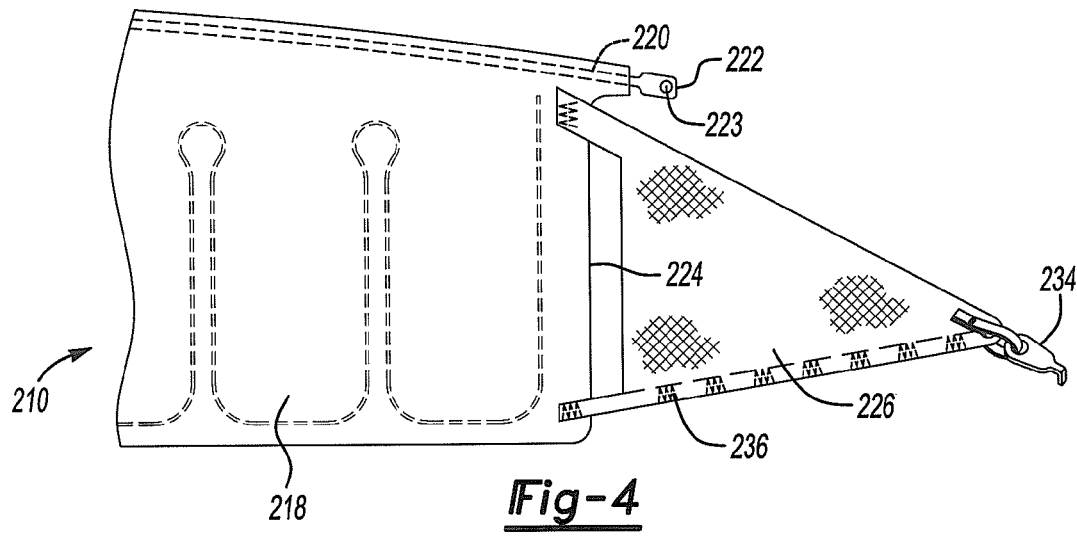
FIG. 4 is a schematic diagram of another alternative embodiment of a sail panel and a portion of an inflatable curtain.

FIG. 4 is a schematic diagram of an alternative embodiment of a portion of system 10. System 210 includes tether 236 attached, e.g., sewn, to curtain 218 for maintaining curtain 218 in a desired position if system 10 is deployed (FIG. 1). Sail panel 226 is attached to tether 236 and curtain 218. A portion of sail panel 226 does not overlap front edge 224 of curtain 218. Sail panel 226 may be attached to curtain 218 in any desired fashion, e.g., sewn, riveted.

Figure 5:
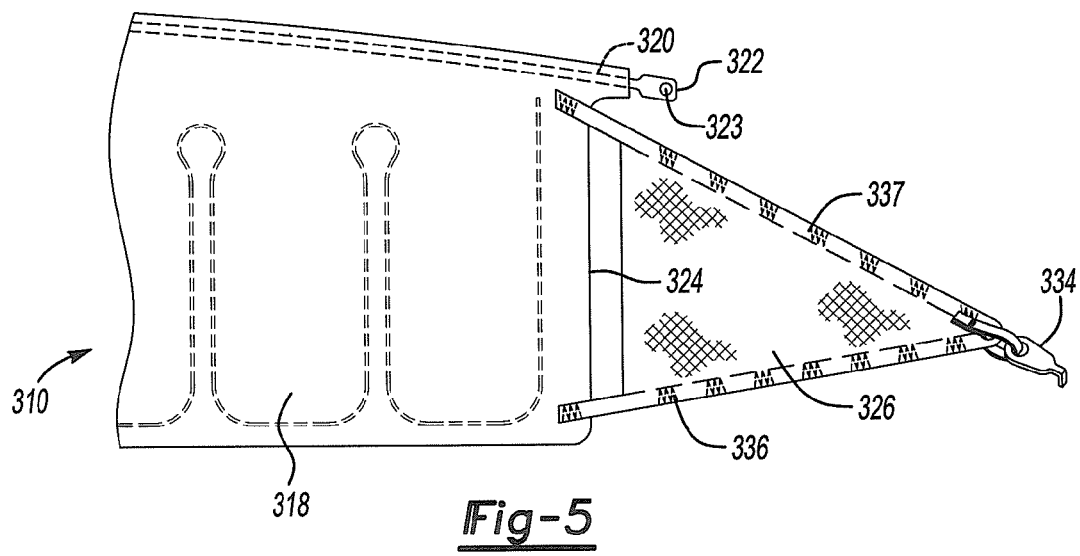
FIG. 5 is a schematic diagram of yet another alternative embodiment of a sail panel and a portion of an inflatable curtain.

FIG. 5 is schematic diagram of an alternative embodiment of a portion of system 10. System 310 includes tethers 336, 337. Sail panel 326 is attached to tethers 336, 337, e.g., sewn. Sail panel 326 does not overlap front edge 324 of curtain 318.

Figure 6:
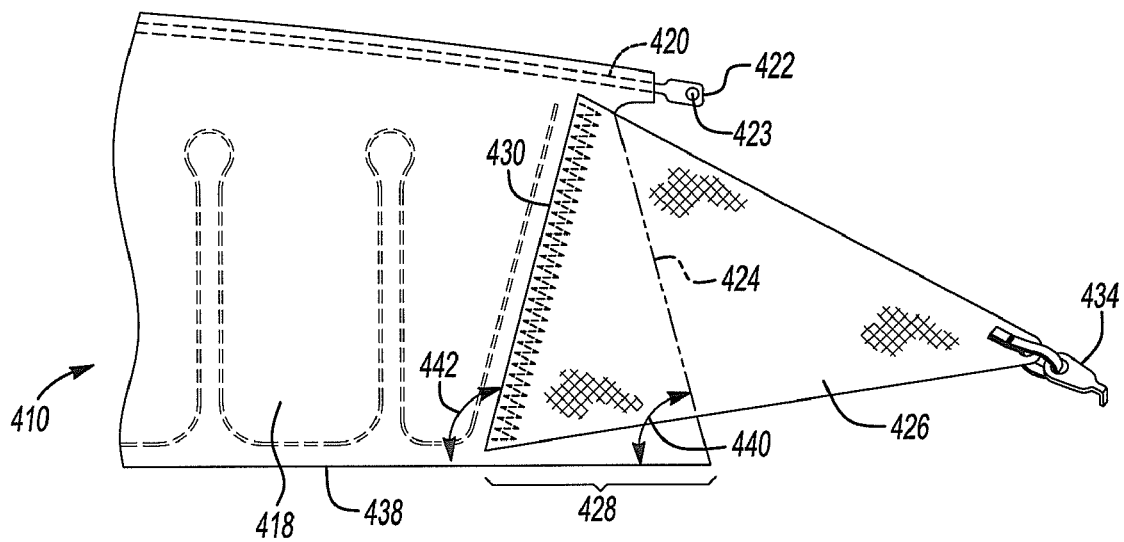
FIG. 6 is a schematic diagram of still another alternative embodiment of a sail panel and a portion of an inflatable curtain.

FIG. 6 is a schematic diagram of an alternative embodiment of a portion of system 10. Curtain 418 includes front edge 424 and bottom edge 438. Front edge 424 and bottom 438 form angle 440.

Sail panel 426 includes overlapping portion 428 and overlapping edge 430. Sail panel 426 is sewn or riveted to curtain 418 along overlapping edge 430. Overlapping edge 430 and bottom edge 438 of inflatable curtain 418 form angle 442. Angle 440 and angle 442 are different.

Figure 7:
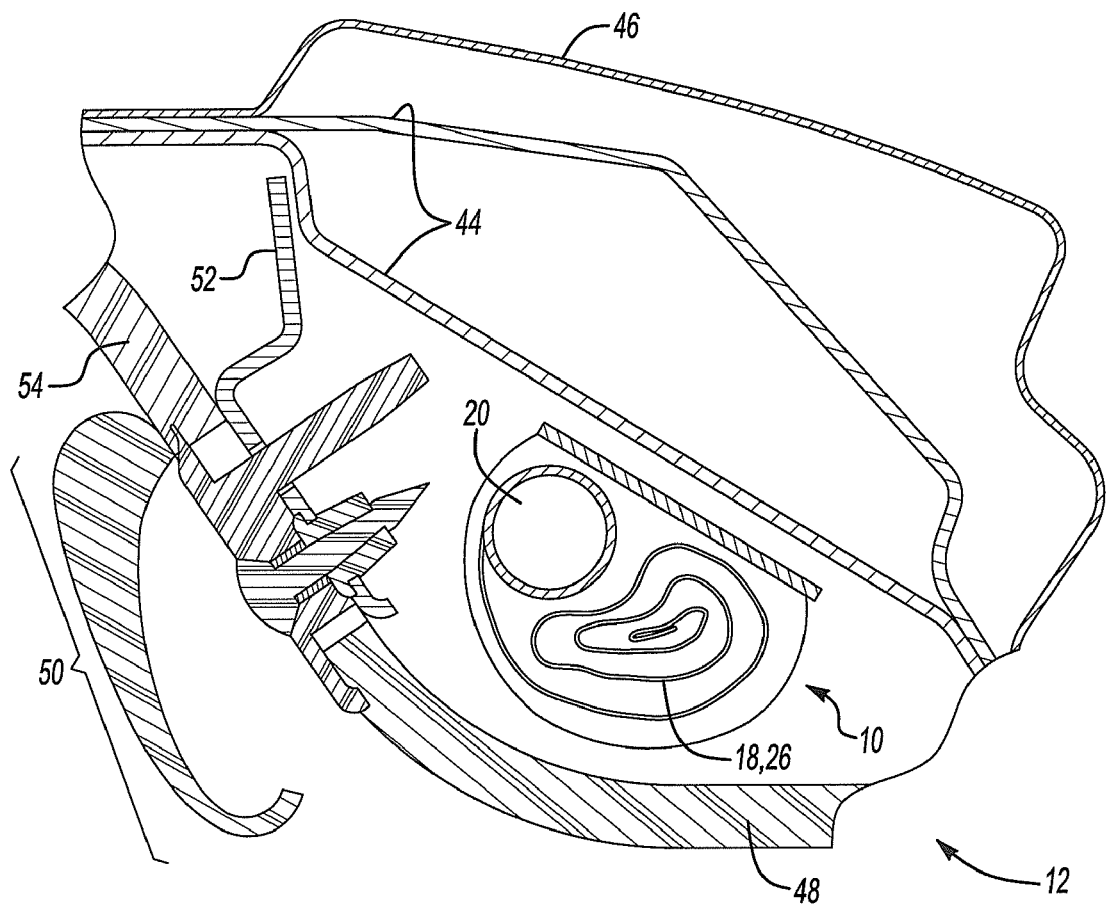
FIG. 7 is a schematic diagram, in cross-section, of a vehicle environment for an embodiment of a pre-deployed curtain airbag system.

FIG. 7 is a schematic diagram, in cross-section, of an environment in which system 10 is installed in vehicle 12. The environment includes roof structures 44, roof panel 46, trim panel 48, grab handle assembly 50 attached to grab handle bracket 52, and headliner 54.

Curtain 18 and sail panel 26 are rolled up as shown. The amount of packaging space available for system 10 in its pre-deployment configuration is limited. The configurations as generally described with reference to FIGS. 2-6 and further as described herein reduce the space taken up by overlapping portion 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A curtain airbag system for a vehicle having a passenger compartment with a front corner, the system comprising:
    an inflatable curtain having a body portion and front, bottom and top edge portions; and
    a sail panel for reducing occupant limb excursion through the front corner of the passenger compartment if the system is deployed, wherein the panel has an overlapping portion including an overlapping edge, defining a width of the panel, that overlaps at least a portion of the front edge portion of the curtain, and wherein the panel is attached to the body portion of the curtain along the overlapping edge to form a seam obliquely extending from the top edge portion of the curtain toward the bottom edge portion of the curtain.

2. The system of claim 1 wherein the sail panel has a triangular shape.

3. The system of claim 1 wherein the sail panel is sewn to the inflatable curtain.

4. A vehicle curtain airbag system comprising:
    an inflatable curtain having a body portion and front, bottom and top edge portions, the front edge portion defining a width of the curtain; and
    a sail panel having a rear edge portion defining a width of the panel, the panel anchored to the body portion of the curtain along the rear edge portion to form a seam obliquely extending from the top edge portion of the curtain to the bottom edge portion of the curtain.

5. The system of claim 4 wherein the sail panel is sewn to the inflatable curtain.

6. The system of claim 4 wherein the sail panel has a triangular shape.

7. A vehicle curtain airbag system comprising:
    an inflatable curtain having a body portion and front, bottom and top edge portions; and
    a sail panel having a rear edge portion defining a width of the panel, the rear edge portion anchored to the body portion of the curtain to form a seam extending slantwise from the top edge portion of the curtain toward the bottom edge portion of the curtain.

8. The system of claim 7 wherein the seam extends slantwise from the top edge portion of the curtain toward the bottom edge portion of the curtain such that when the curtain and panel are rolled up, the seam does not substantially overlap itself.

* * * * *